US011569553B2

(12) United States Patent
Golubkov

(10) Patent No.: US 11,569,553 B2
(45) Date of Patent: Jan. 31, 2023

(54) BATTERY SYSTEM CONFIGURED TO DETECT ABNORMAL BATTERY SYSTEM CONDITIONS AND METHOD OF THE SAME

(71) Applicant: Samsung SDI Co., Ltd., Yongin-si (KR)

(72) Inventor: Andrej Golubkov, Graz (AT)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

(21) Appl. No.: 16/432,622

(22) Filed: Jun. 5, 2019

(65) Prior Publication Data
US 2019/0379030 A1     Dec. 12, 2019

(30) Foreign Application Priority Data

Jun. 6, 2018   (EP) .................................. 18176228
May 28, 2019   (KR) ....................... 10-2019-0062717

(51) Int. Cl.
*B60L 58/12* (2019.01)
*H01M 10/42* (2006.01)
(Continued)

(52) U.S. Cl.
CPC ........... *H01M 50/572* (2021.01); *B60L 58/12* (2019.02); *H01M 10/425* (2013.01);
(Continued)

(58) Field of Classification Search
CPC ............. H01M 50/572; H01M 10/425; H01M 10/6565; H01M 10/441;
(Continued)

(56) References Cited

U.S. PATENT DOCUMENTS 4,107,402 A * 8/1978 Dougherty ........... H01M 50/112
429/120
4,374,187 A * 2/1983 Sano ................... H01M 50/394
429/88
(Continued)

FOREIGN PATENT DOCUMENTS

DE     102008043789 A1    5/2020
EP     2 797 158 A1       10/2014
(Continued)

OTHER PUBLICATIONS

Extended European Search Report issued in EP 18176228.7, dated Oct. 1, 2018, 6 pages.
(Continued)

*Primary Examiner* — Christian Roldan
(74) *Attorney, Agent, or Firm* — Lewis Roca Rothgerber Christie LLP

(57) ABSTRACT

A battery system includes a battery module, a housing, a gas conveyor, and a gas sensor. The battery module is interconnected between a first system terminal and a second system terminal by a plurality of high current connectors, and the housing includes: a plurality of exterior walls enclosing the battery module and the plurality of high current connectors; and a partition wall within the housing. The gas conveyor is configured to circulate a gas flow through a flow channel loop formed within the housing by the partition wall and the exterior walls, and the gas sensor is arranged in the flow channel loop and is configured to detect an excess concentration of a gas species in the gas flow.

15 Claims, 13 Drawing Sheets

(51) Int. Cl.
  *H01M 10/44* (2006.01)
  *B60L 3/00* (2019.01)
  *H01M 10/48* (2006.01)
  *H01M 50/572* (2021.01)
  *H01M 10/6565* (2014.01)

(52) U.S. Cl.
  CPC ..... *H01M 10/441* (2013.01); *H01M 10/6565* (2015.04); *H01M 2010/4271* (2013.01)

(58) Field of Classification Search
  CPC ....... H01M 2010/4271; H01M 10/613; H01M 10/625; H01M 10/482; H01M 10/4207; H01M 50/35; H01M 50/20; H01M 50/502; H01M 2220/20; H01M 10/48; B60L 58/12; B60L 3/12; B60L 3/0046; B60L 50/64; Y02E 60/10; Y02T 10/70
  USPC ......................................................... 429/90
  See application file for complete search history.

(56) References Cited

U.S. PATENT DOCUMENTS

| | | | |
|---|---|---|---|
| 8,944,198 B2 | 2/2015 | Miyazaki et al. | |
| 2011/0260731 A1* | 10/2011 | Alkemade | H01M 10/6563 324/426 |
| 2012/0085109 A1* | 4/2012 | Mandarino | H01M 10/627 62/89 |
| 2013/0071706 A1* | 3/2013 | Lee | H01M 10/6563 429/62 |
| 2015/0325895 A1* | 11/2015 | Landes | H01M 12/08 429/405 |
| 2016/0093933 A1* | 3/2016 | Iida | H01M 10/6554 429/71 |
| 2016/0301115 A1 | 10/2016 | Izumi et al. | |
| 2018/0143157 A1* | 5/2018 | Hansen | G01N 27/4045 |
| 2018/0331402 A1* | 11/2018 | Inoue | H01M 10/425 |
| 2019/0379030 A1 | 12/2019 | Golubkov | |

FOREIGN PATENT DOCUMENTS

| | | | | |
|---|---|---|---|---|
| EP | 2797158 A1 | * | 10/2014 | ............ H01M 50/20 |
| EP | 3579326 A1 | | 12/2019 | |
| JP | 2015-90760 A | | 5/2015 | |
| KR | 10-2014-0012244 A | | 2/2014 | |

OTHER PUBLICATIONS

European Office action issued in corresponding application No. EP 19212582.1, dated Dec. 10, 2020, 3 pages.

EPO Extended Search Report dated May 13, 2020, corresponding to European Patent Application No. 19212582.1 (8 pages).

EP Office action issued in corresponding application No. EP 18 176 228.7, dated May 31, 2021, 4 pages.

* cited by examiner

BATTERY SYSTEM CONFIGURED TO DETECT ABNORMAL BATTERY SYSTEM CONDITIONS AND METHOD OF THE SAME

CROSS-REFERENCE TO RELATED APPLICATION

This application claims priority to and the benefit of Korean Patent Application No. 10-2019-0062717, filed in the Korean Intellectual Property Office on May 28, 2019, and European Patent Application No. 18176228.7, filed in the European Patent Office on Jun. 6, 2018, the entire contents of all of which are incorporated herein by reference.

BACKGROUND

1. Field

Aspects of embodiments of the present invention relate to a battery system configured to detect an abnormal condition of the battery system and a method for detecting an abnormal condition of a battery system.

2. Description of the Related Art

A rechargeable (or secondary) battery differs from a primary battery in that it is designed to be repeatedly charged and discharged, while the latter is designed to undergo an irreversible conversion of chemical energy to electrical energy. Low-capacity rechargeable batteries are often used as power supplies for small electronic devices, such as cellular phones, tablets, or notebook computers, while high-capacity rechargeable batteries may be used as power supplies for vehicles and the like.

Generally, rechargeable batteries include an electrode assembly including a positive electrode, a negative electrode, and a separator interposed between the positive and negative electrodes, a case receiving (or accommodating) the electrode assembly, and an electrode terminal electrically connected to the electrode assembly. An electrolyte solution is injected into the case to enable charging and discharging of the battery via an electrochemical reaction between the positive electrode, the negative electrode, and the electrolyte solution. The shape of the case (e.g., a cylindrical or rectangular shape) depends on the intended purpose of the battery.

Rechargeable batteries may be used as (or used in) a battery module formed of a plurality of unit battery cells coupled to each other in series and/or in parallel so as to provide relatively high energy density for driving a motor of a hybrid vehicle, for example. For example, the battery module is formed by interconnecting the electrode terminals of a plurality of unit battery cells to each other to realize a relatively high-power rechargeable battery for, as an example, an electric vehicle, with the number of unit battery cells being determined based on a desired amount of power.

Battery modules can be constructed according to either a block design or a modular design. In block designs, each battery is coupled to a common current collector structure and a common battery management system, and the unit thereof is arranged in a housing. In modular designs, pluralities of battery cells are connected to each other to form submodules, and several submodules are connected to each other to form the battery module. In automotive applications, battery systems often include a plurality of battery modules connected to each other in series to provide a desired voltage. The battery modules may include submodules having a plurality of stacked (or aligned) battery cells. When each stack of battery cells includes unit battery cells connected to each other in parallel, the stacks are connected to each other in series (XpYs), and when each stack of battery cells includes multiple unit battery cells connected to each other in series, the stacks are connected to each other in parallel (XsYp).

To meet the dynamic power demands of various electrical consumers connected to the battery system, static control of battery power output and charging may not be sufficient. Thus, steady exchange of information between the battery system and the controllers of the electrical consumers may be implemented. This information includes the battery system's actual state of charge (SoC), potential electrical performance, charging ability, and internal resistance as well as the consumers' actual or predicted power demands or surpluses. Therefore, battery systems usually include a battery management system (BMS) to obtain and process such information on a system level and may further include a plurality of cell supervision circuits (CSCs), which are part of the system's battery modules and obtain and process relevant information on a system level. The BMS usually measures the system voltage, the system current, the local temperature at different places inside the system housing, and the insulation resistance between live components and the system housing. Additionally, the CSCs usually measure the individual cell voltages and the temperatures of the battery modules.

The mechanical integration of such a battery system usually involves suitable mechanical connection of the individual battery system components among themselves and with structures of the electrical consumers, such as a vehicle. These connections are designed to remain functional and safe throughout the average service life of the battery system and under the stresses experienced during use of the consumers. Further, installation space, interchangeability, and safety requirements must be considered, especially in mobile applications. Safety requirements, including the protection of passengers of a vehicle from harmful effluents of the battery system, such as toxic gases, smoke, or the like, are usually provided by a gas tight housing enclosing the battery modules and BMS to restrict the emission of such effluents.

However, while the system housing may protect the passengers from harmful fumes, it complicates detection of critical states of the battery system that may lead to a catastrophic event, such as an explosion of the battery system. Such catastrophic events may be caused by abnormal states, like hot spots or corrosion. Previously, the BMS could only detect abnormal states based on the acquired measurements regarding, for example, voltage, current, and temperature. Hence, abnormal states which do not involve a change in the voltage, current, temperature, or electrical insulation value have not been detectable. As some examples, such abnormal states may be due to electrolyte leakage, partial coolant intrusion, water intrusion, hot spots, smoldering insulation material and cables (e.g., pyrolysis or fire), moisture, condensation, corrosion, and/or electric arcing.

The inside of the battery modules is usually not subject to periodic visual inspections, hence, the detection of abnormal operation states via the BMS has been the primary option for detecting such states. Therefore, according to the prior art, corrosion, water intrusion, or deteriorating electric contacts may remain undetected until a catastrophic event actually occurs.

It is thus an object of embodiments of the present invention to overcome or reduce at least some of the drawbacks of the prior art and to provide a battery system that provides improved detection of abnormal states of the battery system, particularly of such abnormal states that do not alter the voltage, current, or temperature of the battery system.

SUMMARY

According to embodiments of the present invention, a battery system is provided that overcomes or mitigates some of the disadvantages of the prior art. The battery system, according to an embodiment of the present invention, includes one or more battery modules, which are interconnected between a first system terminal and a second system terminal by a plurality of high current connectors, and a housing including a plurality of exterior walls enclosing the battery modules and the plurality of high current connectors. One or more partition walls may be arranged within the housing.

According to embodiments of the present invention, a flow channel loop is formed (or defined) within the housing by the partition wall(s) and the exterior walls. The flow channel loop refers to a flow channel that does not have (or does not begin or end in) a gas inlet or a gas outlet but that is a closed loop allowing for controlled gas flow circulation, for example, a spatially confined gas flow circulation, within the battery system housing. According to embodiments of the present invention, a gas conveyor that is configured to provide (or circulate) gas flow through the flow channel loop is arranged (or disposed) in the flow channel loop. For example, the gas conveyor is configured to effect a circulation of gas, e.g., air, present in the housing in (or around) the flow channel loop in a circulatory manner. Further, one or more gas sensors (e.g., a gas sensor array or sensor array) that are configured to detect an excess concentration of a gas species (e.g., a predetermined or learned excess concentration of a gas species) in the gas flow circulation are arranged in the flow channel loop.

According to embodiments of the present invention, all components of the battery system that may cause a catastrophic event (during an abnormal condition) are positioned within (or along) the flow channel loop. Hence, by analyzing a gas stream circulating in the flow channel loop for excess gas concentrations of a gas species indicative of an abnormal condition, an abnormal condition may be reliably detected for all components of the battery system. In some embodiments, the gas circulating inside the housing passes at least all of the high current connectors and all of the battery cells disposed within the housing, and hence, none of them is left unconsidered as the gas flow circulation will pick up gases released from these critical components and transport it to the gas sensor(s). Abnormal conditions of the battery system are, thus, reliably detected. In addition, the forced gas flow circulation ensures that the entire inside of the battery system housing is vented and prevents or reduces the occurrence of condensation of water vapor at cold spots (or in cold environments).

In some embodiments, the battery module(s) (e.g., a plurality of battery modules) and the plurality of high current connectors are arranged within (e.g., entirely within) the flow channel loop. For example, the orientation and positions of these critical components and the dimensions of the flow channel loop are designed such that none of these critical components are disposed within flow shade regions of the flow channel loop. Hence, by arranging the battery module(s) and the plurality of high current connectors entirely within the flow channel loop, these components are also arranged entirely within the gas flow circulation. Thus, the gas flow circulates around the entire battery module(s), the entire plurality of high current connectors, and the gas sensor(s). The plurality of high current connectors and the battery module(s) together form a high current path between the first and second system terminals that runs along (e.g., parallel to) the gas flow circulation. Thus, the gas flow circulation follows the high current path.

The housing of the battery system is essentially gastight. In some embodiments, the housing may further include a pressure equalization filter disposed in one of the exterior walls of the housing to allow a limited gas exchange with the environment. Hence, overpressure in the battery system housing may be reliably prevented. In such an embodiment, the gas flow circulation, except for the emitted gases indicative of an abnormal condition, may be an airflow within the housing. Further, the exterior walls and the partition wall(s) of the housing are essentially gastight. The housing, which includes the exterior walls and the partition wall(s), may be formed of aluminum, such as cast aluminum. However, in other embodiments, plastic materials may be used. The housing may be assembled from several parts, such as a bottom part including the exterior walls and the partition walls, which together form cell compartments, and a top cover for covering the bottom part. The housing may further include sealing elements to provide controlled gas tightness to the environment.

According to one embodiment of the battery system, the flow channel loop may include (e.g., may pass through or may be formed by) one or more cell compartments that are configured to receive (or accommodate) one or more battery modules. Further, the flow channel loop may include an additional compartment that is configured to receive (or accommodate) the gas conveyor and the gas sensor(s). By providing the cell compartment(s), it may be more easy to ensure that the gas flow circulation actually runs over all of the critical components of the battery system. The volume of the cell compartment(s) may be adapted to the volume of the battery module(s) disposed therein. For example, the volume of the cell compartment may not be greater than 150%, preferably not greater than 130%, and particularly preferably not greater than 120% of the volume of the battery module(s) accommodated therein.

Each of the battery modules may include a plurality of battery cells stacked together in a stacking direction (e.g., a longitudinal direction) with their wide side surfaces facing each other to form a longitudinal battery module. The length of the cell compartment may be essentially equal to, e.g., not more than 105% of, the length of the battery module, the width of the cell compartment may be essentially equal to, e.g., not more than 105% of, the width of the wide side surfaces of the battery cells, and the height of the cell compartment may be slightly greater than, e.g., up to 110% of, the height of the battery module. In such cell compartments, the gas flow circulation is primarily constricted to a volume above the upper side of battery modules at where all of the high current connectors between the cells may be arranged, and hence, any flow paths bypassing the battery module can be prevented.

In some embodiments, at least one battery module (e.g., exactly one battery module) may be disposed within each cell compartment with one of first and second module terminals proximate to a gas inlet of the cell compartment and the other one of the first and second module terminals proximate to a gas outlet of the cell compartment. This arrangement allows for relatively easy interconnection of battery modules disposed in adjacent cell compartments and further eases gas flow circulation above all of the battery modules as the first (e.g., positive) module terminal may be arranged at first terminal end of the battery module and the second (e.g., negative) module terminal may be arranged at a second terminal end of the battery module opposite to the first terminal end.

In such an embodiment, one of the cell compartments is fluidly connected to a gas outlet of an adjacent cell compartment or to the additional compartment via its gas inlet and is fluidly connected to a gas inlet of an adjacent cell compartment or to the additional compartment via its gas outlet. The cell compartments may be essentially gastight except for the gas inlets and gas outlets. And by restricting the size of the gas inlets and gas outlets and controlling the positions of the gas inlets and outlets, the gas flow circulation may be controlled. According to such an embodiment, a plurality of cell compartments may be arranged next to each other on a single level. However, in other embodiments, cell compartments may also be stacked above each other in multiple levels.

In some embodiments, the gas conveyor is a fan. However, other gas conveying means, such as pumps or compressors, may be utilized as well. The gas flow may be circulated by a relatively small fan. The fan may include a relatively long service life (life time), such as a common service life of at least ten years. A gas flow cycle time is the time which a particle would need to make a full cycle starting at the gas sensor(s) (e.g., at the sensor array), going through the entire battery system along the flow channel loop, and arriving back at the gas sensor(s). The gas flow cycle time, together with the response time of the sensor array, defines the reaction time of the battery system to an abnormal condition occurring in the battery system. A more powerful fan will decrease the gas flow cycle time and the reaction time of the battery system.

According to one embodiment, the battery system may include a gas sensor array including a plurality of gas sensors disposed within the flow channel loop. Each gas sensor may be configured to detect a concentration of one or more gas species in the gas flow circulation. Generally, different abnormal conditions of a battery system will result in the release of different gas species at different temperatures and with different gas release rates inside the housing of the battery system. By providing a gas sensor array, each of these different gas species may be detected in the range of the respective gas concentration to be expected and, hence, different failure types or abnormal conditions can be reliably detected. By determining the failure type or abnormal condition, specific countermeasures based on the kind of detected abnormal condition may be employed. The gas sensor array may include multiple gas sensors with complementary detection methods for one gas species to increase the detection reliability.

The gas sensor array may include sensors configured to detect at least the concentrations of the following gases or gases of the following gas species: carbon dioxide, carbon monoxide, hydrogen, oxygen, $NO_x$, ozone, water vapor, and hydrocarbons (e.g., methane). The gas sensor array may further include a smoke detector (e.g., a particle detector). Each of these gas sensors may utilize a different measurement principle. For example, a plurality of gas sensors configured to detect the same gas or gas species may be present in the gas sensor array, with each of the gas sensors using a complementary measurement principle to enhance the measurement effectiveness of the gas sensor array.

According to one embodiment, the battery system may include a battery management system (BMS) that is connected to the gas sensor(s). The BMS may be configured to monitor the entire battery system by, for example, measuring system voltage, system current, local temperature at different places inside the system housing, and the insulation resistance between live components and the housing. According to embodiments of the present invention, the gas sensor(s) are configured to transmit a control signal to the BMS in response to detecting the excess concentration of a gas species in the gas flow circulation. The BMS is configured to process the control signal and to detect abnormal conditions of the battery system based on the control signal. For example, the BMS may be configured to determine the presence of one or more of a plurality of abnormal conditions of the battery system in response to receiving one or more control signals from the gas sensor array. The BMS may determine different abnormal conditions of the battery system based on different received control signals. Further, the BMS may include a data interface to the exterior of the battery system and may be configured to transmit error codes or a battery status to external control devices via the data interface. An error code or battery status may be related to an abnormal system condition.

The BMS may be further configured to perform one or more countermeasures in response to the received control signal and/or in response to the determination of an abnormal condition of the battery system. For example, the BMS may be configured to: disconnect at least one of the first system terminal and the second terminal from the battery module(s); switch to an emergency mode of the battery system; transmit a notification to a user of the battery system; increase cooling of the battery system; reduce outputted power of the battery system; and/or trigger a fire extinguisher for the battery system.

According to one embodiment, the battery system may further include a battery disconnect unit (BDU) that is interconnected between at least one of the first and second system terminals and the battery module(s). According to this embodiment, the BMS may be configured to transmit a disconnect signal to the BDU in response to receiving the control signal and/or in response to the determination of the abnormal condition of the battery system. Further, the BDU may be configured to disconnect at least one of the first and second system terminals from the battery module(s) in response to receiving the disconnect signal. In other words, the gas sensor(s), the BMS, and the BDU may together realize an emergency switch-off (shut-off) of the battery system.

Further, the battery system may include a plurality of low current connectors providing a data connection between the battery module(s) and the BMS arranged entirely within the flow channel loop. The low current connectors may be arranged entirely within the flow channel loop. For example, the low current connectors form a low current path, e.g., a data connection, which runs along (e.g., parallel to) the gas flow circulation. Hence, defects along the entire low current path can be sensed by the gas sensor(s). In some embodiments, each battery module may include a cell supervision circuit (CSC), which is configured to measure individual cell voltages and temperatures of the battery modules and may be further configured to actively or passively balance the battery cells of a battery module. The low current connectors may provide a data connection between the CSCs and the BMS via a daisy chain data connection that is not a loop.

Each of the battery modules may include a plurality of aligned battery cells that are electrically connected to each other in series and/or parallel between a first (e.g., positive) module terminal and a second (e.g., negative) module terminal. A plurality of high current connectors may connect a second (e.g., negative) system terminal to the second (e.g., negative) module terminal of one of the battery modules and a first (e.g., positive) system terminal to a first (positive) module terminal of another one of the battery modules. The plurality of high current connectors may include a first high current connector interconnecting the second system terminal with a second module terminal of one battery module and a second high current connector interconnecting a first system terminal with a first module terminal of a battery module. The battery system may further include a plurality of battery modules that are connected to each other in series between the first system terminal and the second system terminal and may further include a third high current connector that interconnects a second module terminal of a first battery module with a first module terminal of a second battery module. The plurality of high current connectors may further include a plurality of fourth high current connectors that interconnect the battery cells within the battery modules. The first-third high current interconnectors may be, for example, high current cables, and the fourth high current interconnectors may be, for example, busbars.

Another embodiment of the present invention relates to a vehicle, such as an electric vehicle or a hybrid vehicle, which includes the battery system according to an embodiment of the present invention as described above. According to this embodiment, the BMS of the battery system may be data connected to a control unit of the vehicle via, for example, a CAN bus. Further, the BMS may be configured to issue a warning to a driver of the vehicle in response to the control signal and/or to request battery service for the vehicle from a service provider.

Another embodiment of the present invention relates to a method for detecting an abnormal condition of a battery system. The battery system may include one or more battery modules, which are interconnected between a first system terminal and a second system terminal by a plurality of high current connectors, a housing including a plurality of exterior walls enclosing the battery module(s) and the plurality of high current connectors and one or more partition walls arranged within the housing. The method may include conveying (or circulating) a gas flow through a flow channel loop formed (or defined) in the housing by the partition wall(s) and the exterior walls, detecting a concentration of one or more gas species in the gas flow circulation, and transmitting a control signal in response to detecting an excess concentration of the gas species.

The gas may be conveyed along the flow channel loop by a gas conveyor disposed in the flow channel loop, and the concentration of a gas species may be detected by one or more gas sensors disposed in the flow channel loop. Further, the control signal may be transmitted by the gas sensor(s) to a battery management system (BMS) disposed inside or outside the housing of the battery system. The battery system utilized to perform the method according to embodiments of the present invention may be any of the above-described battery systems according to embodiments of the present invention.

The method according to embodiments of the present invention may be employed in battery systems used for different purposes. As one example, the method may be used in battery systems employed in a vehicle. Independent of the application (or use) of the battery system, the transmission of the control signal may intervene with (e.g., severely intervene with or stop) the normal operation of the battery system.

Hence, false positive events that erroneously indicate an abnormal condition of the battery system should be prevented at any costs. On the other hand, first (or early) signs of imminent failure of components within the battery system should not be ignored, and in the event of an imminent failure, the battery system should be brought to a safe state as early as possible in order to reliably prevent catastrophic events, such as a battery fire. The method according to embodiments of the present invention provides a reliable solution for detecting early signs of an abnormal condition of a battery system as well as for estimating the state of health of safety critical components of the battery system.

In the method according to embodiments of the present invention, the state of the battery system is determined according to the concentration of one or more gas species in the battery system. For example, a control signal is transmitted when the gas concentration of the gas or gas species exceeds a reference (e.g., a predetermined or learned) threshold for that gas or gas concentration. A specific control signal from among a plurality of control signals may be transmitted in response to detecting a reference (e.g., predetermined or learned) excess concentration of one or more gases or gas species. For example, a specific control signal from among a plurality of control signals is transmitted in response to detecting a combination (e.g., a predetermined combination) of excess (e.g., predetermined or learned) concentrations for a plurality of gases or gas species.

The combination of excess gas concentrations that may occur in the battery system for a specific abnormal operation conditions are indicated in the following Table 1 for a plurality of abnormal operation conditions.

TABLE 1

|  | hot spots, plastic smoldering | electric arc between live components | electrolysis, fluid intrusion, coolant leaks | electrolyte leaks | cell venting (overpressure) | cell Venting (thermal runaway) | fire |
|---|---|---|---|---|---|---|---|
| carbon dioxide ($CO_2$) | x |  |  | x | x | x | x |
| carbon monoxide (CO) | x |  |  |  |  | x | x |
| hydrogen ($H_2$) |  |  | x |  |  | x |  |
| oxygen |  |  | x |  |  |  |  |

TABLE 1-continued

| | hot spots, plastic smoldering | electric arc between live components | electrolysis, fluid intrusion, coolant leaks | electrolyte leaks | cell venting (overpressure) | cell Venting (thermal runaway) | fire |
|---|---|---|---|---|---|---|---|
| ($O_2$) | | | | | | | |
| nitrogen oxides ($NO_x$) | | x | | | | | |
| ozone ($O_3$) | | x | | | | | |
| water vapor ($H_2O$) | x | | x | | | | |
| Hydrocarbons | x | | | x | x | x | x |
| smoke/particles | x | x | | | x | x | x |

The method according to embodiments of the present invention may further include detecting a combination of excess gas concentrations or gas species concentrations in a forced gas flow circulation provided within a flow channel loop within the battery system's housing and detecting a one of the combinations of excess gas concentrations or gas species concentrations as indicated in Table 1. The detecting of the gas concentration or gas species may be carried out by a gas sensor array disposed in the flow channel loop of the battery system. The method according to embodiments of the present invention may further include transmitting one or more of (e.g., a combination) of control signals associated with the detected combination of excess concentrations to, for example, a battery management system (BMS) or to another control unit (e.g., another controller) of the battery system. However, in some embodiments, the method may include transmitting a single control signal associated with the detected combination of excess concentrations to, for example, the BMS or to another control unit of the battery system.

The method according to embodiments of the present invention may further include receiving a combination of control signals or a single control signal associated with a detected combination of excess concentrations and determining the presence of one or more of the abnormal conditions as indicated in Table 1 within the battery system. These acts may be carried out by the BMS of the battery system or any other suitable control unit of the battery system.

The method according to embodiments of the present invention may further include controlling (e.g., controlling to perform) one or more countermeasures associated with the determined abnormal condition(s) of the battery system in response to the reception of the control signal(s) and/or the determination of the presence of an abnormal condition on the battery system.

In response to receiving the control signal(s) and/or determining the presence of an abnormal condition on the battery system, the battery module may be controlled to disconnect at least one of the first system terminal and the second terminal from the battery module(s), to switch to an emergency mode, to transmit a notification to a user of the battery system, to increase cooling of the battery system, to reduce a state of power (SOP) of the battery system, and/or to trigger a fire extinguishing system for the battery system.

Controlling (e.g., controlling to perform) a countermeasure may include transmitting a countermeasure control signal to an entity (or component) that actually performs the countermeasure. For example, controlling (e.g., controlling to perform) a countermeasure may include transmitting a countermeasure control signal via an interface of a battery management system to an exterior of the battery system. Controlling (e.g., controlling to perform) a countermeasure may include transmitting, via an interface of the BMS, a disconnect signal as the countermeasure control signal to a battery disconnect unit (BDU) that controls (or commands) the BDU to disconnect at least one of the first and second system terminal and the battery module(s).

Further aspects and features of embodiments of the present invention will become apparent from the attached drawings and/or the following description of the attached drawings.

BRIEF DESCRIPTION OF THE DRAWINGS

Aspects and features of the present invention will become more apparent to those of ordinary skill in the art by describing, in detail, exemplary embodiments thereof with reference to the attached drawings, in which.

DETAILED DESCRIPTION

Figure 1:
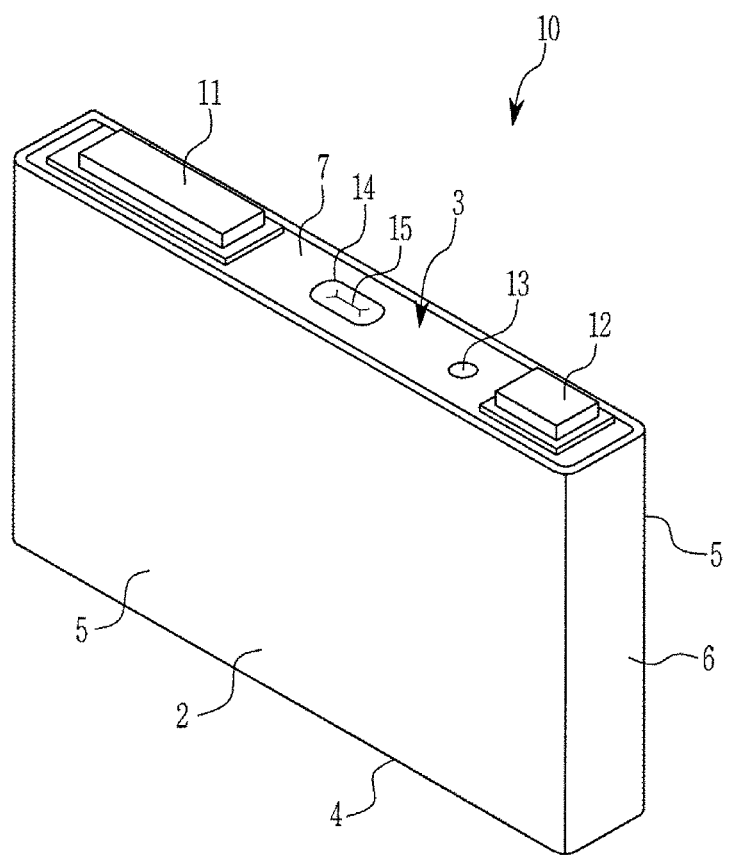
FIG. 1 is a perspective view of a battery cell according to an embodiment.

Reference will now be made in detail to embodiments, examples of which are illustrated in the accompanying drawings. Aspects and features of the exemplary embodiments, and implementation methods thereof, will be described with reference to the accompanying drawings. In the drawings, like reference numerals denote like elements, and redundant descriptions thereof may be omitted. As used herein, the term "and/or" includes any and all combinations of one or more of the associated listed items. Further, the use of "may" when describing embodiments of the present invention refers to "one or more embodiments of the present invention." Although the present invention is described herein in connection with various specific embodiments, it will be obvious to a person skilled in the art that these embodiments may be suitably modified without departing from the spirit and scope of the present invention. All such modifications are deemed to be within the scope of the claims and their equivalents.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments. In the figures, dimensions of the various elements, layers, etc. may be exaggerated for clarity of illustration.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Expressions, such as "at least one of," when preceding a list of elements, modify the entire list of elements and do not modify the individual elements of the list. Also, the term "exemplary" is intended to refer to an example or illustration.

As used herein, the terms "substantially," "about," and similar terms are used as terms of approximation and not as terms of degree and are intended to account for inherent deviations in measured or calculated values that would be recognized by those of ordinary skill in the art. Further, if the term "substantially" is used in combination with a feature that could be expressed using a numeric value, the term "substantially" denotes a range of +/−5% of the value centered around the value. Herein, the terms "upper" and "lower" are defined according to the z-axis. For example, an upper cover is positioned at the upper part of the z-axis, and a lower cover is positioned at the lower part of the z-axis.

FIG. 1 is a perspective view of a battery cell according to an exemplary embodiment.

As shown in FIG. 1, a battery cell 10 according to an embodiment may include an electrode assembly and a case 2 for accommodating the electrode assembly. The case 2 may contain an electrolyte. The battery cell 10 may also include a cap assembly 3 for sealing an opening in the case 2. The battery cell 10 is described as a lithium ion secondary battery having a prismatic shape as a non-limiting example, and the present invention is not limited thereto.

The case 2 may have a substantially cuboidal shape, and an opening may be formed in one side thereof. The case 2 may be formed of a metal, such as aluminum. The case 2 may have a bottom surface 4 having a substantially rectangular shape and may include a pair of first lateral walls (e.g., wide side surfaces) 5 and a pair of second lateral walls (e.g., narrow side surfaces) 6. The first and second lateral walls 5 and 6 may be connected vertically to end portions (e.g., ends or edges) of the bottom surface 4, respectively, to form a space for accommodating the electrode assembly. The first lateral walls 5 may face each other, and the second lateral walls 6 may be positioned to face each other and may be connected to the first lateral walls 5. A length of edges of the bottom surface 4 at where the first lateral walls 5 are connected may be longer than a length of edges of the bottom surface 4 at where the second lateral walls 6 are connected. In some embodiments, adjacent first and second lateral walls 5 and second 6 enclose (or form) an angle of about 90°.

The cap assembly 3 may include a cap plate 7 for covering (or sealing) the opening in the case 2 by being bonded to the case 2 and may include a first battery cell terminal (e.g., a positive terminal) 11 and a second battery cell terminal (e.g., a negative terminal) 12, which externally protrude from the cap plate 7 and are electrically connected to electrodes of the electrode assembly (e.g., are electrically connected to the positive electrode and the negative electrode, respectively, of the electrode assembly). The cap plate 7 may have a plate shape that extends in one direction, and the cap plate 7 may be bonded to the opening in the case 2 (e.g., may be bonded to the case 2 around the opening therein). The cap plate 7 may include an injection opening (e.g., an injection hole) 13 and a vent opening (e.g., a vent hole) 14 that communicate with an interior of the case 2. The injection opening 13 may be configured to allow for injection of the electrolyte solution, and a sealing cap may be mounted thereon or therein. Further, a vent member 14 may be mounted to or in the vent opening 14. The vent member 14 may include a notch 15 configured to open the vent member 14 at a reference pressure (e.g., at a predetermined pressure).

Figure 2:
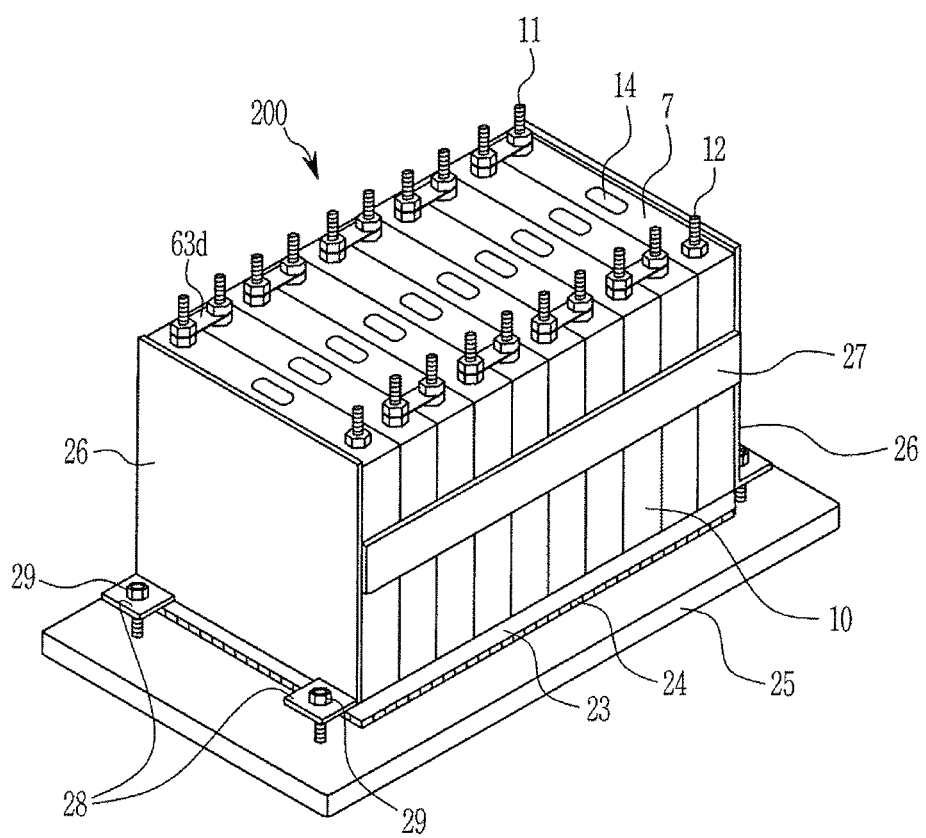
FIG. 2 is a perspective view of a battery module.

Referring to FIG. 2, an exemplary embodiment of a battery module 200 includes a plurality of battery cells 10, such as the battery cell 10 illustrated in FIG. 1, aligned along one direction and a heat exchange member 23 provided adjacent to a bottom surface of the plurality of battery cells 10. In addition, an elastic member 24 made of rubber or of other suitable elastic materials may be interposed between a support plate 25 and the heat exchange member 23. A pair of end plates 26 are provided to face wide side surfaces 5 of the outermost ones of the battery cells 10, and connection plates 27 connect the pair of end plates 26 to each other, thereby fixing the plurality of battery cells 10 together. Fastening portions 28 on both sides of the battery module 200 are fastened to the support plate 25 by bolts 29.

In the battery module 200, each battery cell 10 is a prismatic (or rectangular) cell, and the wide side surfaces 5 of the battery cells 10 are stacked together (e.g., face each other) to form the battery module 200. The positive and negative electrode terminals 11 and 12 of neighboring battery cells 10 are electrically connected to each other through a busbar 63d, and the busbar 63d may be fixed by a nut or the like. Hence, the battery module 200 may be used as power source unit by electrically connecting the plurality of battery cells 10 to each other as one bundle.

Figure 3:
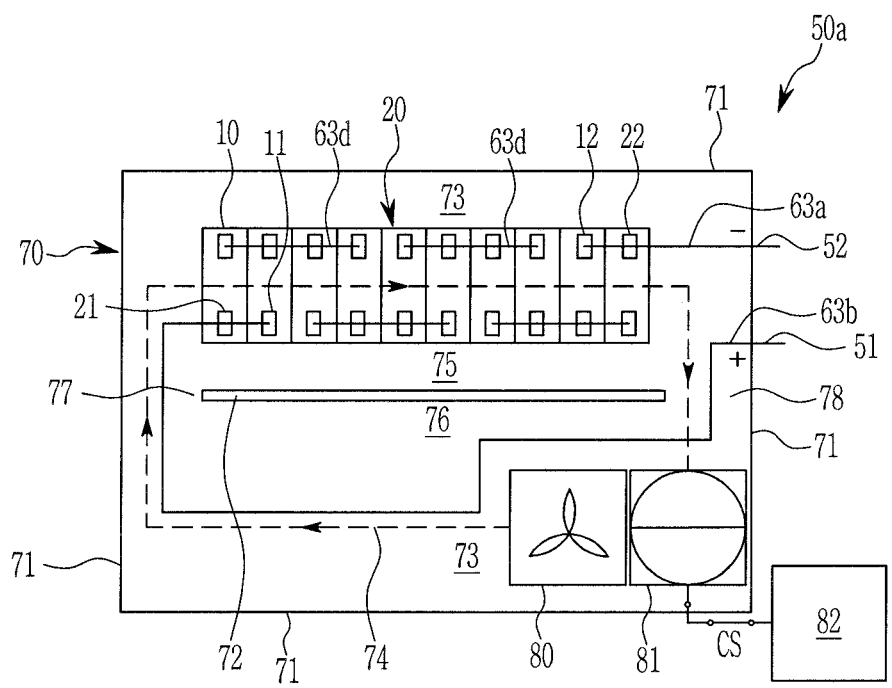
FIG. 3 is a top view of a battery system according to a first embodiment.

FIG. 3 is a top view illustrating a battery system 50a according to a first embodiment.

The battery system 50a illustrated in FIG. 3 is a battery system 50a that may be utilized in an electric vehicle, may have an overall dimension of about 0.6 m*0.4 m*0.13 m (width/depth/height), and may have a single level of battery cells 10. The battery system 50a includes a housing 70 with a support plate, four lateral exterior walls 71, and a single linearly extending partition wall 72 arranged at a center of the housing 70. The housing 70 may be closed by a top cover to provide an essentially gastight housing 70 for the battery system 50a.

The partition wall 72 divides the housing 70 in a cell compartment 75 and an additional compartment 76. The cell compartment 75 is connected to (e.g., communicates with) the additional compartment 76 via a gas inlet 77 and a gas outlet 78. The partition wall 72 is essentially gastight and extends along the entire height of the housing 70 (e.g., extends from the support plate of the housing 70 to the top cover of the housing 70). Thus, a flow channel loop 73 is formed in the interior of the housing 70 that extends from the additional compartment 76 into the cell compartment 75 via the gas inlet 77 and, from there, again into the additional compartment 76 via the gas outlet 78. A gas conveyor 80, such as a fan, and a gas sensor array 81 including a plurality of gas sensors are arranged in the flow channel loop 73, and, in some embodiments, in the additional compartment 76.

The fan 80 is configured to provide gas flow circulation 74 (e.g., the fan 80 is configured to circulate a gas flow) along the flow channel loop 73 as indicated by the dashed line in FIG. 1. The gas flow circulation 74 begins at the fan 80 and runs through the additional compartment 76, from there into the cell compartment 75 via the gas inlet 77, and from there, to the gas sensor array 81 and the fan 80 via the gas outlet 78.

A battery module 20 is arranged in the cell compartment 75. The battery module 20 includes a plurality of (e.g., ten) battery cells 10 that are aligned (or stacked) in a stacking direction with their wide side surfaces 5 facing each other. The stacking direction of the battery module 20 is also the longitudinal direction of the battery module 20 along which the battery module 20 has its largest extension direction (or dimension). The battery module 20 is positioned in the cell compartment 75 such that its longitudinal direction is essentially parallel to the partition wall 72.

The battery cells 10 of the battery module 20 are connected to each other via busbars (e.g., fourth high current connectors) 63d in a 2p5s configuration. Therefore, each busbar 63d connects two first cell terminals 11 and two second cell terminals 12 (i.e., a total of four cell terminals 11/12) to each other. A second module terminal 22 of the battery module 20 is connected to a second (e.g., negative) system terminal 52 of the battery system 50a via a first high current connector 63a, such as a first high current cable, and a first module terminal 21 of the battery module 20 is connected to a first (e.g., positive) system terminal 51 of the battery system 50a via a second high current connector 63b, such as a second high current cable.

A high current path is formed by the first high current connector 63a, the second high current connector 63b, and the fourth high current connectors 63d. This current path extends from the first system terminal 51 via the gas outlet 78 into and through the additional compartment 76, from there into the cell compartment 75 via the gas inlet 77, and from there to the second system terminal 52 via the battery module 20. Hence, the current path is disposed within (e.g., is disposed entirely within) the flow channel loop 73 and follows the gas flow circulation 74. For example, the gas flow circulation 74 flows around (e.g., through) all components of the high current path and over all of the battery cells 10 of the battery module 20, and hence, the gas flow circulation will take up (e.g., will remove or exhaust) any gas or particle emission of any of the components of the current path or the battery cells 10.

The gas sensor array 81 is carefully positioned in the additional compartment 76 such that the gas flow 74 circulating in the flow channel loop 73 passes through the gas sensor array 81. The gas sensor array 81 thus detects the concentration of at least one gas or gas species in the gas flow circulation 74. When the gas sensor array 81 detects that the concentration of at least one gas or gas species in the gas flow circulation 74 exceeds a reference (e.g., a predetermined or learned) threshold, that is, detects an excess concentration of at least one gas or gas species in the gas flow circulation 74, the gas sensor array 81 transmits a control signal CS to a battery management system (BMS) 82 located outside the housing 70 of the battery system 50a. The BMS 82 may then determine the presence of an abnormal condition in the battery system 50as and perform (or control to perform) one or more countermeasures associated with the determined abnormal condition, such as, for example, transmitting a warning signal to the vehicle's driver.

Figure 4:
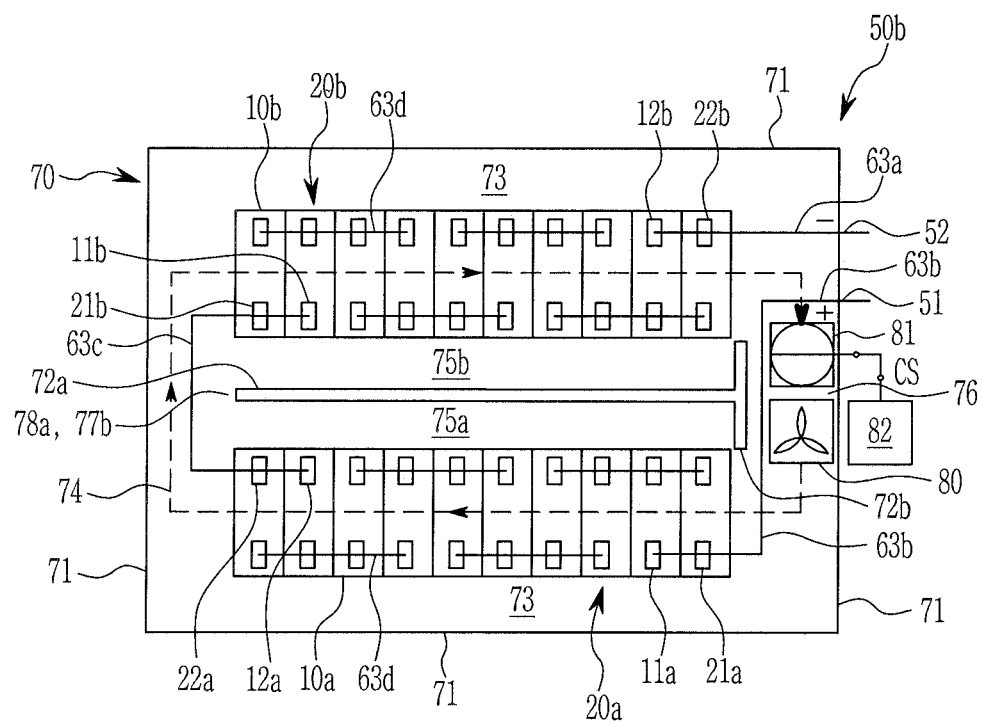
FIG. 4 is a top view of a battery system according to a second embodiment.

FIG. 4 is a top view of a battery system 50b according to a second embodiment. Like components of the battery system 50b shown in FIG. 4 are denoted with like reference signs as in FIG. 3, and a repeated description of like components may be omitted.

The battery system 50b shown in FIG. 4 differs from the battery system 50a shown in FIG. 3 in that it includes two partition walls 72a, 72b that form a T-shaped partition wall 72. A first section 72a of the T-shaped partition wall 72 is positioned similar to the partition wall 72 shown in FIG. 3, and a second section 72b of the T-shaped partition wall 72 is positioned at a right angle to and in contact with the first section 72a. The second section 72b is shorter than the first section 72a.

Two cell compartments 75a, 75b are formed on opposite sides of the first section 72a between exterior walls 71 and the partition wall 72, and two battery modules 20a, 20b are positioned in the cell compartments 75a, 75b. The longitudinal direction of the battery modules 20a, 20b is parallel to the first section 72a. An additional compartment 76 is formed between the second section 72b and an exterior wall 71, and the fan 80 and the gas sensor array 81 are positioned in the additional compartment 76.

In some embodiments, each of the battery modules 20a, 20b includes ten battery cells 10a, 10b that are aligned (or stacked) in the longitudinal direction with their wide side surfaces 5 facing each other. The battery cells 10a, 10b are connected to each other in a 2p5s configuration by four busbars 63d, respectively. A first system terminal 51 is connected to a first module terminal 21a of the first battery module 20a via a second high current connector 63b. A second module terminal 22a of the first module battery 20a is connected to a first module terminal 21b of the second battery module 20b via a third high current connector 63c, and a second module terminal 22b of the second battery module 20b is connected to a second system terminal 52 via a first high current connector 63a.

The first, second, third, and fourth high current connectors 63a, 63b, 63c, 63d form a current path that extends from the second system terminal 52 to the first system terminal 51 through the flow channel loop 73 formed by the additional compartment 76, the first cell compartment 75a, and the second cell compartment 75b. The first cell compartment 75a is connected to (e.g., communicates with) the second cell compartment 75b via a first gas outlet 78a that is also the second gas inlet 77b of the second cell compartment 75b. Gas flow circulation 74 provided by the fan 80 within the flow channel loop 73 follows the current path and flows around all of the battery cells 10 (e.g., flows through the battery modules 20a, 20b) and all of the high current connectors 63 of the battery system 50b.

The gas flow circulation 74 passes the gas sensor array 81 that detects any excess gas or particle concentration therein. In response to detecting an excess gas concentration, the gas sensor array 81 transmits a control signal CS to a battery management system 82, which is positioned outside the housing 70. The battery management system 82 may then determine the presence of an abnormal condition in the battery system 50b and perform (or control to perform) one or more countermeasures associated with the determined abnormal condition. For example, the BMS 82 may transmit a warning signal to the vehicle's driver or may shut off the battery system 50b.

Figure 5:
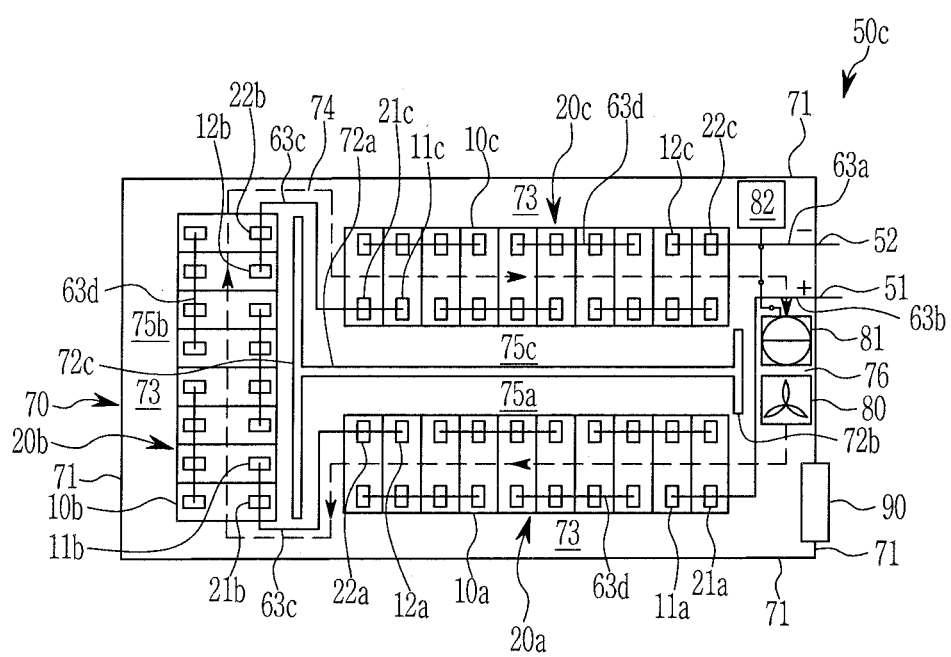
FIG. 5 is a top view of a battery system according to a third embodiment.

FIG. 5 is a top view of a battery system 50c according to a third embodiment. Like components of the battery system shown in FIG. 5 are denoted with like reference signs as in FIGS. 3 and 4, and a repeated description of like components may be omitted.

The battery system 50c shown FIG. 5 differs from the battery systems 50a and 50b, shown in FIGS. 3 and 4, respectively, in that the housing 70 of the battery system 50c shown in FIG. 5 including three partition walls 72a, 72b, 72c that form a double T-shaped (e.g., an I-shaped or uneven I-shaped) partition wall 72. A first section 72a of the double T-shaped partition wall 72 is positioned similar to the first section 72a shown in FIG. 4, a second section 72b of the T-shaped partition wall 72 is positioned similar to the second section 72b shown in FIG. 4, and a third section 72c of the partition wall 72 is positioned at a right angle to and in contact with the first section 72a and opposite and parallel to the second section 72b. The third section 72c is shorter than the first section 72a and longer than the second section 72b. The housing 70 further differs from the housing 70 shown in FIGS. 3 and 4 in that it includes a pressure equalization filter 90 arranged within an exterior wall 71 that is configured to allow limited gas communication between an interior and an exterior of the housing 70 in order to prevent over- or under-pressure within the housing 70. The filter 90 may block dust from entering the housing 70.

Two cell compartments 75a, 75c are formed on opposite sides of the first section 72a between the exterior walls 71 and the partition wall 72. Two battery modules 20a, 20c are respectively positioned in the cell compartments 75a, 75c. The longitudinal direction of the battery modules 20a, 20c is parallel to the first section 72a. Another cell compartment 75b is formed between the third section 72c and the exterior wall 71, and a battery module 20b is positioned in the cell compartment 75b. An additional compartment 76 is formed between the second section 72b and the exterior wall 71, and the fan 80 and the gas sensor array 81 are positioned in the additional compartment 76.

In some embodiments, the battery modules 20a, 20c each include ten battery cells 10a, 10c that are aligned (or stacked) in the longitudinal direction with their wide side surfaces 5 facing each other. The battery cells 10a, 10c are connected to each other in a 2p5s configuration by four busbars 63d, respectively. The battery module 20b may include fewer battery cells 10b than the battery modules 20a, 20c. For example, in some embodiments, the battery module 20b includes eight battery cells 10b that are aligned (or stacked) in the longitudinal direction with their wide side surfaces 5 facing each other. The battery cells 10b are connected to each other in a 2p4s configuration by three busbars 63d, respectively. A first system terminal 51 is connected to a first module terminal 21a of the first battery module 20a via a second high current connector 63b. A second module terminal 22a of the first battery module 20a is connected to a first module terminal 21b of the second battery module 20b via a third high current connector 63c. A second module terminal 22b of the second battery module 20b is connected to a first module terminal 21c of the third battery module 20c via another third high current connector 63c, and a second module terminal 22c of the third battery module 20c is connected to a second system terminal 52 via a first high current connector 63a.

The first, second, third, and fourth high current connectors 63a, 63b, 63c, 63d form a current path that extends from the second system terminal 52 to the first system terminal 51 through the flow channel loop 73 formed by the cell compartments 75a, 75b, 75c, and the additional compartment 76. Gas flow circulation 74 provided by the fan 80 within the flow channel loop 73 follows this current path and flows around all of the battery cells 10 and all of the high current connectors 63 of the battery system 50c.

The gas flow circulation 74 passes the gas sensor array 81 that detects any excess gas or particle concentration therein. In response to detecting an excess gas concentration, the gas sensor array 81 transmits a control signal CS to a battery management system 82, which is positioned inside the housing 70. The BMS 82 may then determine the presence of an abnormal condition in the battery system 50c and perform (or control to perform) one or more countermeasures associated with the determined abnormal condition. For example, the BMS 82 may transmit a warning signal to the vehicle's driver or shut off the battery system 50c.

Figure 6:
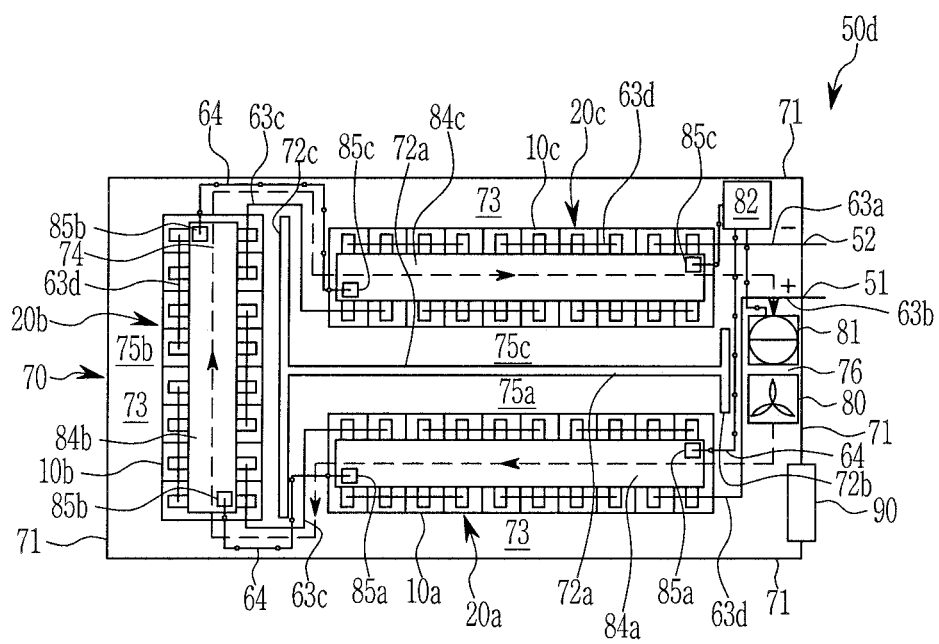
FIG. 6 is a top view of a battery system according to a fourth embodiment.

FIG. 6 is a top view of a battery system 50d according to a fourth embodiment. Like components of the battery system 50d shown in FIG. 6 are denoted with like reference signs as the battery system 50c shown in FIG. 5, and a repeated description of like components may be omitted.

The battery system 50d shown in FIG. 6 differs from the battery system 50c shown in FIG. 5 in that each of the battery modules 20a, 20b, 20c includes a cell supervision circuit (CSC) 84a, 84b, 84c, respectively. The CSCs 84a, 84b, 84c are arranged on top of the battery modules 20a, 20b, 20c and are connected to at least some of the battery cells 10a, 10b, 10c of the respective battery modules 20a, 20b, 20c in order to measure cell voltages of the connected battery cells 10a, 10b, 10c. The CSCs 84a, 84b, 84c may be further configured to measure temperatures of the individual battery modules 20a, 20b, 20c and/or to provide active or passive cell balancing between the battery cells 10a, 10b, 10c of the respective battery modules 20a, 20b, 20c.

The CSCs 84a, 84b, 84c are connected to the battery management system (BMS) 82 via a plurality of low current connectors 64. Each of the CSCs 84a, 84b, 84c includes two contact pads 85a, 85b, 85c for providing a connection to the low current connectors 64. A connection between the contact pads 85 of adjacent battery modules 20 or between a battery module 20 and the BMS 82 is thus established via the low current connectors 64 connected to one or more of the contact pads 85. The plurality of low current connectors 64 form a data connection between the BMS 82 and the CSCs 84a, 84b, 84c, of the battery modules 20a, 20b, 20c. The data connection may be a looped or single-ended data connection.

As illustrated in FIG. 6, the low current connectors 64 run through the flow channel loop 73 formed by the cell compartments 75a, 75b, 75c, and the additional compartment 76. Gas flow circulation 74 provided by the fan 80 within the flow channel loop 73 follows the data connection and flows around all of the battery cells 10, all of the high current connectors 63, and all of the low current connectors 64 of the battery system 50d. The gas flow circulation 74 passes the gas sensor array 81 that detects any excess gas or particle concentration therein.

Figure 7:
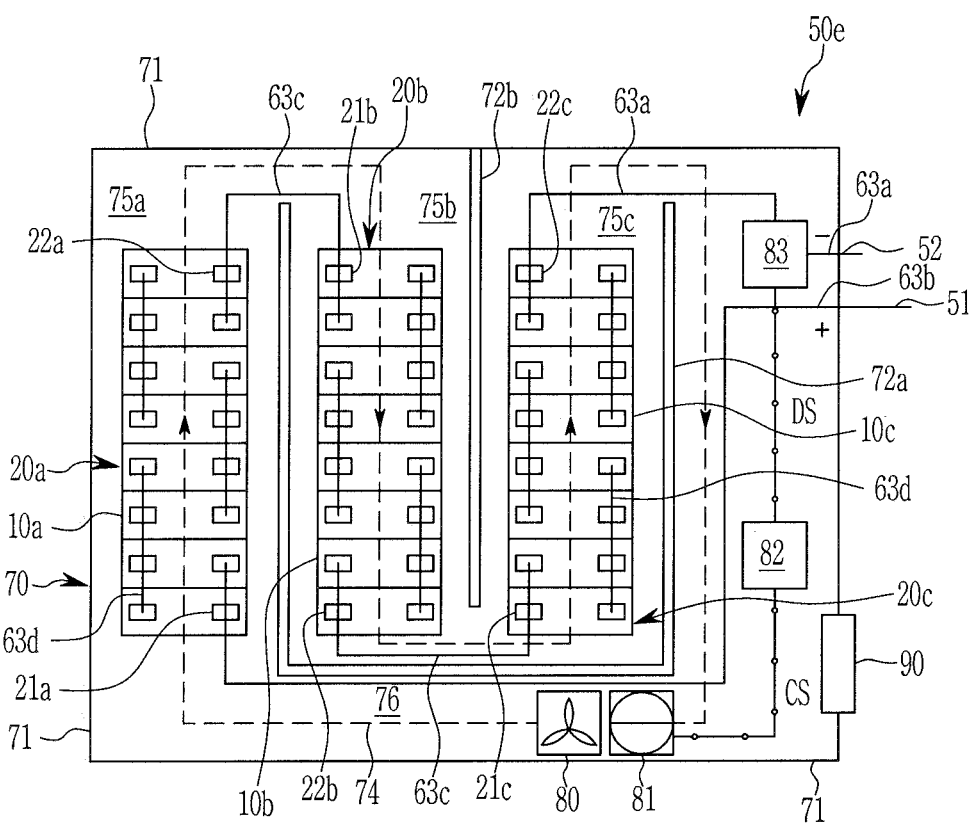
FIG. 7 is a top view of a battery system according to a fifth embodiment.

FIG. 7 is a top view of a battery system 50e according to a fifth embodiment. Like components of the battery system 50e shown in FIG. 7 are denoted with like reference signs as the battery systems 50a, 50b, 50c, and 50d, shown in FIGS. 3-6, respectively, and a repeated description of like components may be omitted.

The battery system 50e shown in FIG. 7 differs from those of FIGS. 3-6 in that the housing 70 of the battery system 50e includes a first U-shaped partition wall 72a arranged in the center of the housing 70 without contacting any exterior wall 71 and a second partition wall 72b that extends perpendicularly from an exterior wall 71 and into the U-shaped partition wall 72a (e.g., into a space between parallel sections or portions of the U-shaped partition wall 72a).

The lower horizontal section of the U-shaped partition wall 72a extends parallel to an exterior wall 71, and an additional compartment 76 is formed between the lower horizontal section of the U-shaped partition wall 72a and the exterior wall 71. Further, three cell compartments 75a, 75b, 75c are formed between the two vertical (e.g., the two parallel) sections of the U-shaped partition wall 72a and the second partition wall 72b. The battery modules 20a, 20b, 20c are respectively positioned in the cell compartments 75a, 75b, 75c with their longitudinal directions being parallel to the second partition wall 72b.

In some embodiments, the battery modules 20a, 20b, 20c each include eight battery cells 10a, 10b, 10c that are aligned (or stacked) in the longitudinal direction with their wide side surfaces facing each other. The battery cells 10a, 10b, 10c are connected to each other in a 2p4s configuration by three busbars 63d, respectively.

A first system terminal 51 is connected to a first module terminal 21a of the first battery module 20a via a second high current connector 63b. A second module terminal 22a of the first battery module 20a is connected to a first module terminal 21b of the second battery module 20b via a third high current connector 63c. A second module terminal 22b of the second battery module 20b is connected to a first module terminal 21c of the third battery module 20c via another third high current connector 63c, and a second module terminal 22c of the third battery module 20c is connected to a second system terminal 52 via a first high current connector 63a.

The first, second, third, and fourth high current connectors 63a, 63b, 63c, 63d form a current path that extends from the second system terminal 52 to the first system terminal 51 through the flow channel loop 73 formed by the cell compartments 75a, 75b, 75c, and the additional compartment 76. Gas flow circulation 74 provided by the fan 80 within the flow channel loop 73 follows this current path and flows around all of the battery cells 10 and all of the high current connectors 63 of the battery system 50e.

The gas flow circulation 74 passes the gas sensor array 81 that detects any excess gas or particle concentration therein. In response to detecting an excess gas concentration, the gas sensor array 81 transmits a control signal CS to a battery management system (BMS) 82, which is positioned inside the housing 70. The BMS 82 may then determine the presence of an abnormal condition in the battery system 50e.

In response to determining an abnormal condition in the battery system 50e, the BMS 82 transmits a disconnect signal DS to a battery disconnect unit (BDU) 83 that is interconnected between (e.g., is electrically connected between) the second system terminal 52 and the second module terminal 22c of the battery module 20c. In response to receiving the disconnect signal DS, the BDU 83 disconnects the electrical connection between the battery module 20c and the second system terminal 52. Hence, an emergency shut down of the battery system 50e is performed.

Figure 8:
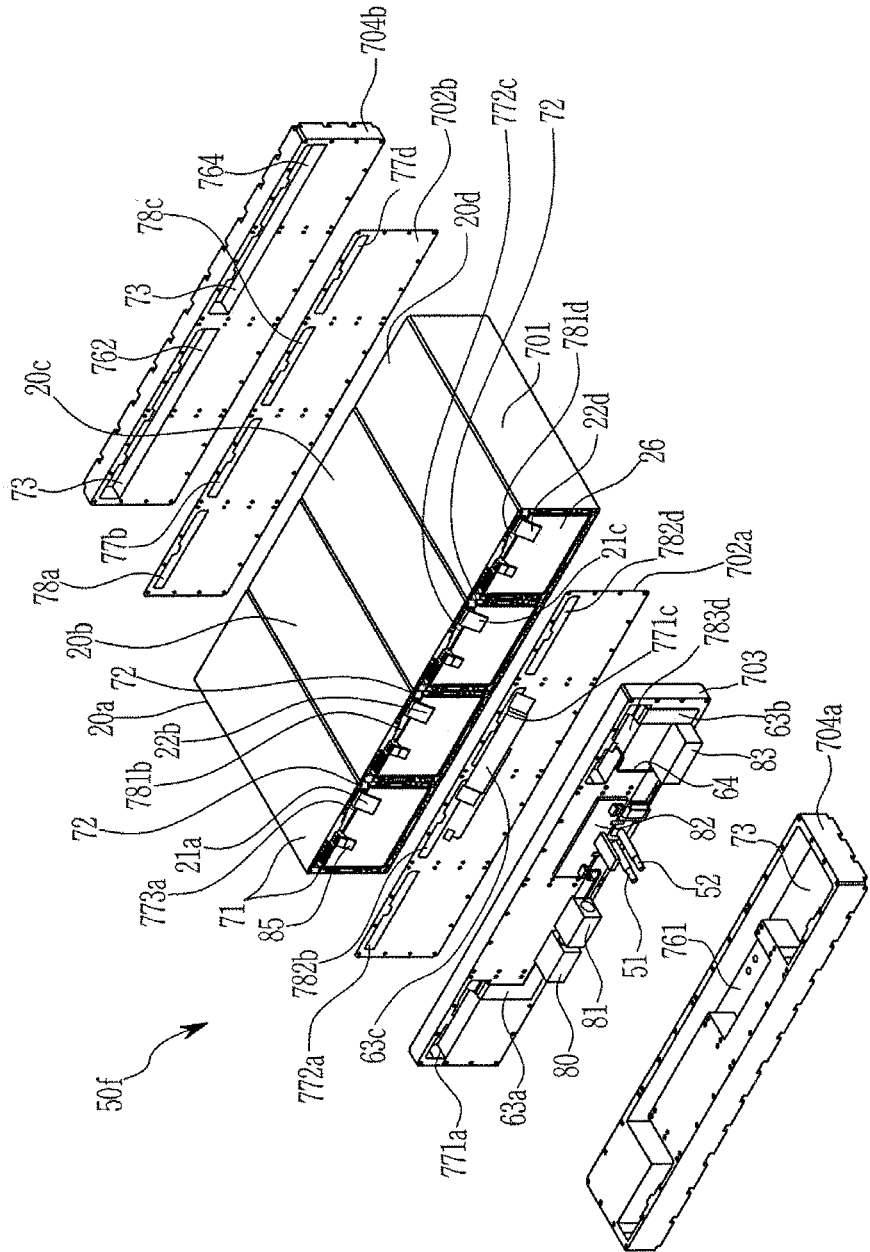
FIG. 8 is an exploded front perspective view of a battery system according to a sixth embodiment.

FIG. 8 is a schematic perspective front view of a battery system 50f according to a sixth embodiment. Like components of the battery system 50f shown in FIG. 8 are denoted with like reference signs as in the battery systems 50a, 50b, 50c, 50d, and 50e, shown in FIGS. 3-7, respectively, and a repeated description of like components may be omitted. In the battery system 50f shown in FIG. 8, the battery system housing 70 includes of a plurality of components, and the flow channel loop 73 is formed by the combination of these components.

The battery system 50f includes four battery modules 20a, 20b, 20c, 20d that are enclosed by a module housing part 701. The module housing part 701 is formed by a plurality of extruded aluminum profiles, each enclosing a single battery module 20 as shown in more detail in FIGS. 10 and 12. Each extruded aluminum profile covers the top, bottom, and side surfaces of the respective battery modules 20a, 20b, 20c, 20d. The walls of the extruded aluminum profiles form either exterior walls 71 or partition walls 72 depending on the position of the extruded aluminum profile in the module housing part 701. The walls of the extruded aluminum profiles include hollows (e.g., hollow or open portions) in order to provide a lightweight battery system 50f. The extruded aluminum profiles are connected to each other via suitable connecting means, such as by mechanical connecting devices (e.g., screws, bolts, clamps, etc.) or a weld connection, such that the battery modules 20a, 20b, 20c, 20d are arranged next to each other with their front and end surfaces, each covered by an end plate 26, facing the same directions (e.g., being parallelly aligned to each other, respectively).

Figure 10:
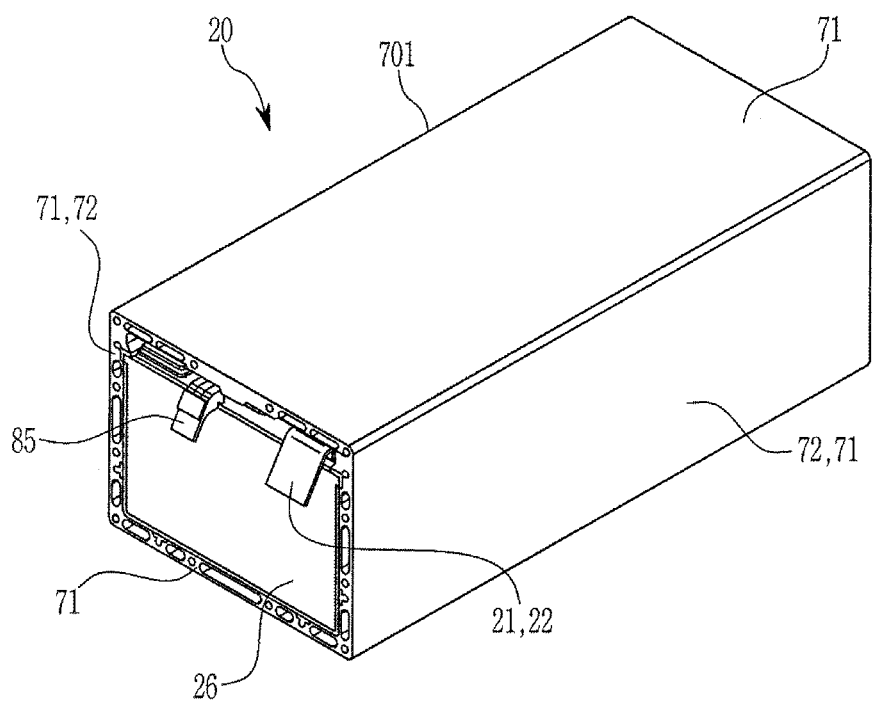
FIG. 10 is a detailed perspective view of a battery module housing according to the sixth embodiment.
Figure 11:
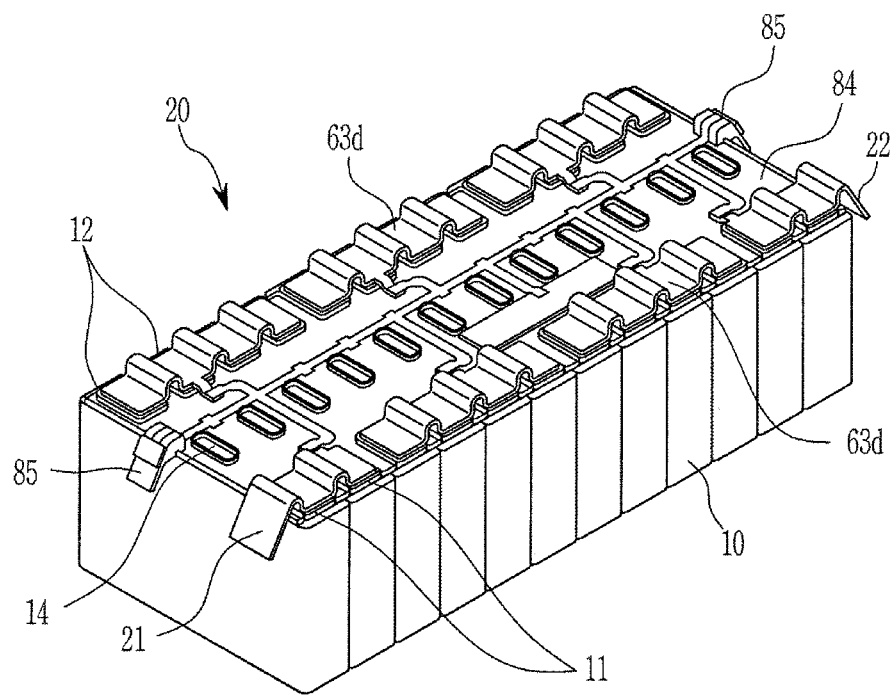
FIG. 11 is a detailed perspective view of a battery module according to the sixth embodiment.
Figure 12:
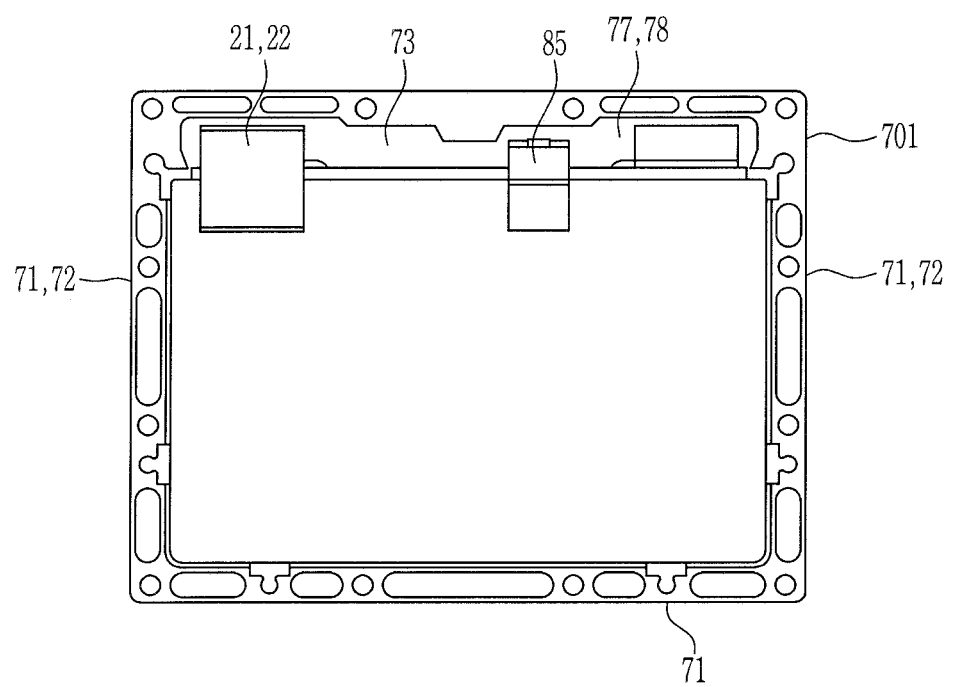
FIG. 12 is a cross-sectional view of the battery module according to the sixth embodiment.

A battery module 20, such as that depicted in FIG. 11, is disposed in each of the extruded aluminum profiles, such as those depicted in FIGS. 10 and 12. As illustrated in FIG. 12, a gas flow channel 73 is positioned (e.g., is positioned in an open space) between an upper side of the battery module 20 (e.g., all of the cap assemblies 3 of the battery cells 10) and the extruded aluminum profile such that gas flow circulation 74 can pass over each of the battery cells 10.

The battery system housing 70 further includes pressure plates 702 that are disposed adjacent to the aligned front and end surfaces, respectively, of the battery modules 20a, 20b, 20c, 20d. On a front side of the battery system 50f, a first pressure plate 702a is arranged adjacent to the aligned front surfaces of the battery modules 20a, 20b, 20c, 20d. A ground cover 703 is arranged adjacent to the first pressure plate 702a, and a first side cover 704a is arranged adjacent to the ground cover 703 such that the ground cover 703 is arranged between the first pressure plate 702a and the first side cover 704a. On a rear side of the battery system 50f, a second pressure plate 702b is arranged adjacent to the aligned end surfaces of the battery modules 20a, 20b, 20c, 20d, and a second side cover 704b is arranged adjacent to the second pressure plate 702b such that the second pressure plate 702b is disposed between the battery modules 20a, 20b, 20c, 20d and the second side cover 704b.

Figure 13:
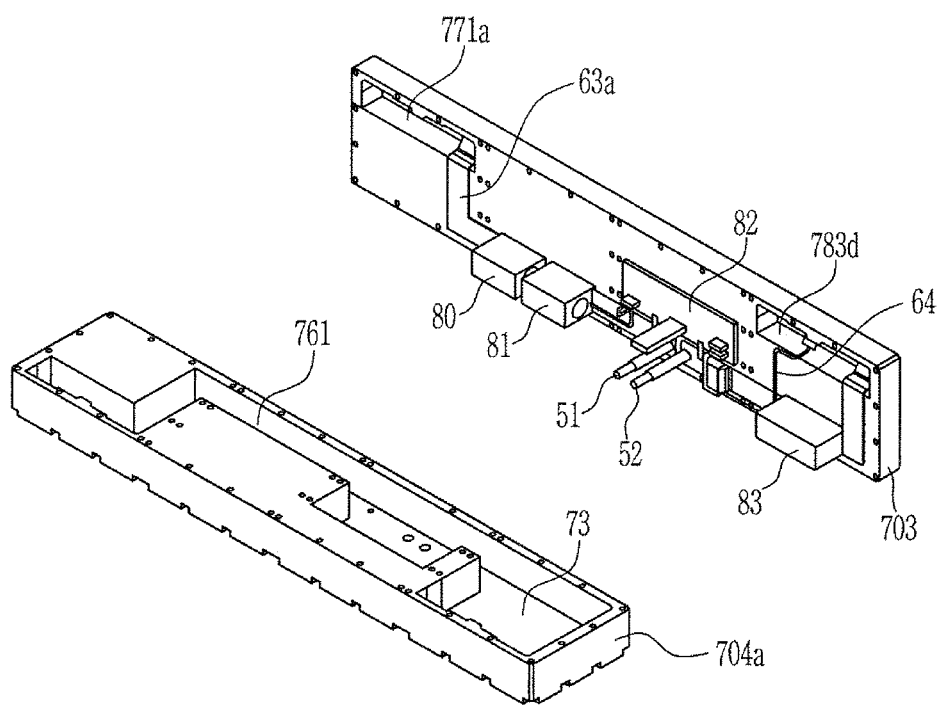
FIG. 13 is a detailed perspective view of housing parts of the battery system according to the sixth embodiment.

A gas conveyor 80, a gas sensor 81, a BMS 82, and a BDU 83 are disposed on a front side of the ground cover 703 and are configured to fit in a first additional compartment 761 formed as a recess in an inner (e.g., rear) surface of the first side cover 704a as illustrated in more detail in FIG. 13. The first additional compartment 761 constitutes a part of the flow channel loop 73. A first system terminal 51 and a second system terminal 52 emerge from the ground cover 703 and penetrate outwards through respective openings in the first side cover 704a.

The first system terminal 51 is connected via a first high current connector 63a to a first module terminal 21a of a first battery module 20a, and the first high current connector 63a passes through a first gas inlet 771a in the ground cover 703 and through a second gas inlet 772a in the first pressure plate 702a. As illustrated in FIG. 11, the first module terminal 21a is connected to first battery cell terminals 11 of two of the outermost battery cells 10 of the battery module 20, and the second battery cell terminals 12 of these two outermost cells 10 are connected via a busbar 63d to two adjacent battery cells 10. These two adjacent battery cells 10 are again connected to another pair of adjacent battery cells 10 via a further busbar 63d and so forth until another pair of outermost battery cells 10 is reached. The second battery cell terminals 12 of this other pair of outermost battery cells 10 are connected to second module terminal 22. In the battery module 20 shown in FIG. 11, twelve battery cells 10 are so connected to each other in a 2p6s configuration, but the present invention is not limited thereto.

Figure 9:
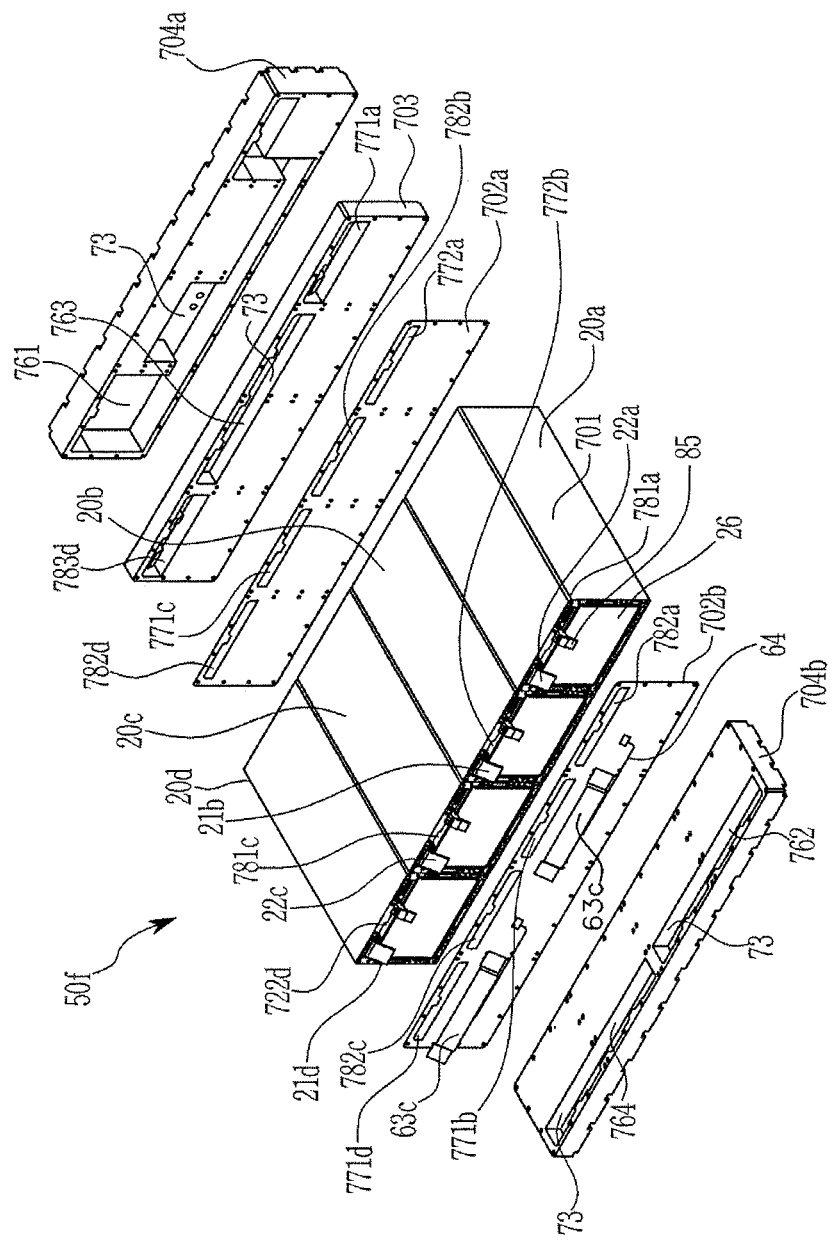
FIG. 9 is an exploded rear perspective view of the battery system according to the sixth embodiment.

As illustrated in FIG. 9, the second module terminal 22a of the first battery module 20a is connected to the first module terminal 21b of an adjacent second battery module 20b via a third high current connector 63c, which is attached to the second pressure plate 702b. The second battery module 20b also has the configuration as shown in FIG. 11. A second module terminal of the second battery module 20b is connected to the first module terminal 21c of an adjacent third battery module 20c via a third high current connector 63c, which is attached to the first pressure plate 702a. The third battery module 20c also has the configuration as shown in FIG. 11. A second module terminal of the third battery module 20c is connected to the first module terminal 21d of an adjacent fourth battery module 20d via a third high current connector 63c, which is attached to the second pressure plate 702b. The fourth battery module 20d also has the configuration as shown in FIG. 11. A second module terminal 22d of the fourth battery module 20d is connected to the second system terminal 52 via a second high current connector 63b that is connected to the ground cover 703. The second high current connector 63b passes through a second gas outlet 782d in the first pressure plate 702a and a third gas outlet 783d in the ground cover 703. Thus, a closed high current path between the first system terminal 51 and the second system terminal 52 is formed by the combination of the first-third high current connectors 63a, 63b, 63c and the busbars 63d.

This high current path between the first and second system terminals 51, 52 is within (e.g., is entirely within and/or follows) a flow channel loop 73 formed within the housing of the battery system 50f according to the sixth embodiment. Gas flow circulation 74 is actuated by the gas conveyor 80 within the first additional compartment 761 of the first side cover 704a. The gas flow circulation 74 then passes through the first gas inlet 771a and the second gas inlet 772a described above into a third gas inlet 773a formed by the front cross section of the gap between the first battery module 20a and the extruded aluminum profile enclosing it (see also, e.g., FIG. 11). The gas flow circulation 74 then passes over all of the battery cells 10 of the first battery module 20a and leaves the extruded aluminum profile via the first gas outlet 781a formed by the rear cross section of the gap between the first battery module 20a and the extruded aluminum profile enclosing it as illustrated in FIG. 9.

The gas flow circulation 74 exits the first battery module 20a via the first gas outlet 781a then passes through the second gas outlet 782a in the second pressure plate 702b into a second additional compartment 762 formed as a recess in an inner (e.g., front) side of the second side cover 704b. This second additional compartment 762 is in fluid connection with (e.g., is in fluid communication with) the second gas outlet 782a and with an adjacent first gas inlet 771b in the second pressure plate 702b and fluidly connects the second gas outlet 782a and the first gas inlet 771b as part of the flow channel loop 73. The gas flow circulation 74 passes through the first gas inlet 771b into a second gas inlet 772b. The second gas inlet is formed by the rear gap between the second battery module 20b and the extruded aluminum profile enclosing it.

The gas flow circulation 74 then passes through the entire second battery module 20b and flows over all of the battery cells 10 and busbars 63d of the second battery module 20b. The gas flow circulation 74 leaves the second battery module 20b via a first gas outlet 781b formed by the front gap between the second battery module 20b and the extruded aluminum profile and through a second gas outlet 782b formed in the first pressure plate 702a. A third additional compartment 763 is formed as a recess in an inner (e.g., rear) side of ground cover 703 and fluidly connects the first gas outlet 781b associated with the second battery module 20b and the first gas inlet 771c associated with the third battery module 20c. The gas flow circulation 74 passes through the first gas inlet 771c into a second gas inlet 772c, which is formed by the front gap between third battery module 20c and the extruded aluminum profile enclosing it.

The gas flow circulation 74 then passes through the entire third battery module 20c and flows over all of the battery cells 10 and busbars 63d of the third battery module 20c. The gas flow circulation 74 leaves the third battery module 20c via a first gas outlet 781c formed by the rear gap between the third battery module 20c and the extruded aluminum profile and through a second gas outlet 782c formed in the second pressure plate 702b. The gas flow circulation 74 then passes into a fourth additional compartment 764 formed as a recess in an inner (e.g., front) side of the second side cover 704b.

This fourth additional compartment 764 is in fluid connection with (e.g., fluid communication with) the second gas outlet 782c and with a first gas inlet 771d in the second pressure plate 702b and fluidly connects the second gas outlet 782c and the first gas inlet 771d as part of the flow channel loop 73. The gas flow circulation 74 passes through the first gas inlet 771d into a second gas inlet 772d, which is formed by the rear gap between the fourth battery module 20d and the extruded aluminum profile enclosing it.

The gas flow circulation 74 then passes through the entire fourth battery module 20d and flows over all of the battery cells 10 and busbars 63d of the fourth battery module 20d. The gas flow circulation 74 leaves the fourth battery module 20d via a first gas outlet 781d formed by the front gap between the fourth battery module 20d and the extruded aluminum profile, through a second gas outlet 782d formed in the first pressure plate 702a, and through a third gas outlet 783d formed in the ground cover 703. The gas flow circulation 74 then flows again into and through the first additional compartment 761 as part of the flow channel loop 73 and finally passes the gas sensor 81 for gas concentration analysis. The gas flow circulation 74 is then again actuated by gas conveyor 80 for another loop through flow channel loop 73.

Hence, in the battery system 50f according to the sixth embodiment, the gas flow circulation 74 follows the high current path formed by the first-third high current connectors 63a, 63b, 63c and the busbars 64d through the multipart housing 70 of the battery system 50f. Thus, gas emitted by any part of the battery system 50f that is associated with the high current path may be picked up the gas flow circulation 74 and can be detected by the gas sensor 81.

SOME REFERENCE NUMERALS 2 case
3 cap assembly
4 bottom surface
5 first lateral walls (wide side surfaces)
6 second lateral walls (narrow side surface)
7 cap plate
10 battery cell
11 first cell terminal (positive)
12 second cell terminal (negative)
13 injection opening
14 vent opening
15 notch
20a, 20b, 20c, 20d first to fourth battery modules
21 first module terminal (positive)
22 second module terminal (negative)
23 heat exchange member
24 elastic member
25 support plate
26 end plates
27 connection plate
28 fastening portion
29 bolt
50 battery system
51 first system terminal (positive)
52 second system terminal (negative)
63 high current connectors
63a first high current connector
63b second high current connector
63c third high current connector
63d busbars
64 low current connector
70 housing
701 housing part
702 pressure plate
703 ground cover
704 side cover
71 exterior wall
72 partition wall
73 flow channel loop
74 gas flow circulation
75 cell compartment
76 additional compartment
77 gas inlet
78 gas outlet
80 gas conveyor
81 gas sensor
82 battery management system (BMS)
83 battery disconnect unit (BDU)
84 cell supervision circuit (CSC)
85 contact pad
CS control signal
DS disconnect signal
90 pressure equalization filter

What is claimed is:

1. A battery system comprising:
    a battery module interconnected between a first system terminal and a second system terminal by a plurality of high current connectors;
    a housing comprising:
        a bottom part;
        a top cover;
        a plurality of exterior walls, the bottom part, the top cover, and the plurality of exterior walls enclosing the battery module and the plurality of high current connectors; and
        a partition wall within the housing and adjacent to the battery module, the partition wall extending along an entire height of the housing and contacts both of the bottom part and the top cover;
    a gas conveyor configured to circulate a gas flow through a flow channel loop formed within the housing by the partition wall and the plurality of exterior walls; and
    a gas sensor configured to detect an excess concentration of a gas species in the gas flow, the gas sensor being arranged in the flow channel loop,
    wherein the battery module is on the bottom part,
    wherein ends of the partition wall are spaced from the plurality of exterior walls,
    and
    wherein the gas flow is formed to follow a current path between the first system terminal and the second system terminal by the spaces between the ends of the partition wall and the plurality of exterior walls.

2. The battery system of claim 1, wherein the battery module and the plurality of high current connectors are arranged within the flow channel loop.

3. The battery system of claim 1, wherein the gas flow circulates through the entire battery module, over all of the high current connectors, and by the gas sensor.

4. The battery system of claim 1, wherein a cell compartment configured to accommodate the battery module and an additional compartment configured to accommodate the gas conveyor and the gas sensor are defined in the housing along the flow channel loop.

5. A battery system comprising:
    a battery module interconnected between a first system terminal and a second system terminal by a plurality of high current connectors;
    a housing comprising:

a bottom part;

a top cover;

a plurality of exterior walls, the bottom part, the top cover, and the plurality of exterior walls enclosing the battery module and the plurality of high current connectors; and a partition wall within the housing and adjacent to the battery module;

a gas conveyor configured to circulate a gas flow through a flow channel loop formed within the housing by the partition wall and the plurality of exterior walls; and a gas sensor configured to detect an excess concentration of a gas species in the gas flow, the gas sensor being arranged in the flow channel loop, wherein the battery module is on the bottom part, wherein ends of the partition wall are spaced from the plurality of exterior walls, wherein the gas flow is formed to follow a current path between the first system terminal and the second system terminal by the partition wall, wherein a cell compartment configured to accommodate the battery module and an additional compartment configured to accommodate the gas conveyor and the gas sensor are defined in the housing along the flow channel loop, and wherein the battery module is arranged within the cell compartment such that one of a first and second module terminals is proximate to a gas inlet of the cell compartment and the other one of the first and second module terminals is proximate to a gas outlet of the cell compartment.

6. The battery system of claim 4, wherein an adjacent cell compartment is defined within the housing along the flow channel loop, and wherein the cell compartment is fluidly connected to the adjacent cell compartment or the additional compartment via a gas outlet or a gas inlet of the cell compartment.

7. The battery system of claim 1, further comprising a gas sensor array comprising a plurality of gas sensors, wherein each of the gas sensors is configured to detect a concentration of a gas species in the gas flow.

8. The battery system of claim 1, further comprising a battery management system connected to the gas sensor, wherein the gas sensor is configured to transmit a control signal to the battery management system in response detection of the excess concentration of the gas species in the gas flow.

9. The battery system of claim 8, further comprising a battery disconnect unit interconnected between at least one of the first and second system terminals and the battery module, wherein the battery management system is configured to transmit a disconnect signal to the battery disconnect unit in response to receiving the control signal, and wherein the battery disconnect unit is configured to disconnect the at least one of the first and second system terminals and the battery module in response to receiving the disconnect signal.

10. The battery system of claim 8, further comprising a plurality of low current connectors configured to provide a data connection between the battery module and the battery management system, the low current connectors being arranged within the flow channel loop.

11. The battery system of claim 1, wherein the plurality of high current connectors comprises:

a first high current connector interconnecting the second system terminal with a second module terminal of the battery module; and a second high current connector interconnecting the first system terminal with a first module terminal of the battery module.

12. The battery system of claim 11, further comprising a plurality of battery modules connected to each other in series between the first system terminal and the second system terminal, wherein the plurality of high current connectors further comprises a third high current connector interconnecting a second module terminal of a first one of the battery modules with a first module terminal of a second one of the battery modules.

13. An electric vehicle comprising the battery system of claim 1.

14. A method for detecting an abnormal condition of the battery system of claim 1, the method comprising:

circulating gas flow through a flow channel loop defined in the housing by the plurality of exterior walls and the partition wall;

detecting a concentration of a gas species in the gas flow; and transmitting a control signal in response to detection of an excess concentration of the gas species in the gas flow.

15. The method of claim 14, further comprising:

determining the presence of an abnormal condition in the battery system; and controlling a countermeasure associated with the abnormal condition.

\* \* \* \* \*